(12) United States Patent
Levergood et al.

(10) Patent No.: US 7,313,735 B1
(45) Date of Patent: Dec. 25, 2007

(54) IN-LINE SERVER HEALTH CHECKING

(75) Inventors: Thomas M. Levergood, Hopkinton, MA (US); Peter R. Holland, Cambridge, MA (US); David S. Caplan, Acton, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 507 days.

(21) Appl. No.: 10/836,676

(22) Filed: Apr. 30, 2004

(51) Int. Cl.
*G06F 11/00* (2006.01)

(52) U.S. Cl. ........................................ 714/47
(58) Field of Classification Search ................ 714/47; 709/223, 224, 225, 226
See application file for complete search history.

(56) References Cited

U.S. PATENT DOCUMENTS

| | | | |
|---|---|---|---|
| 6,609,213 B1 * | 8/2003 | Nguyen et al. ................. | 714/4 |
| 6,738,811 B1 * | 5/2004 | Liang ........................... | 709/224 |
| 6,802,021 B1 * | 10/2004 | Cheng et al. ................... | 714/4 |
| 2002/0091969 A1 * | 7/2002 | Chen et al. .................... | 714/43 |
| 2003/0204588 A1 * | 10/2003 | Peebles et al. ................ | 709/224 |
| 2003/0226056 A1 * | 12/2003 | Yip et al. ...................... | 714/4 |
| 2005/0132030 A1 * | 6/2005 | Hopen et al. .................. | 709/223 |
| 2005/0228880 A1 * | 10/2005 | Champlin ..................... | 709/224 |
| 2005/0262381 A1 * | 11/2005 | Ishida ........................... | 714/4 |

\* cited by examiner

*Primary Examiner*—Robert Beausoliel
*Assistant Examiner*—Amine Riad
(74) *Attorney, Agent, or Firm*—Chapin IP Law, LLC; Barry W. Chapin, Esq.

(57) ABSTRACT

A system and method provide in-line server health checks to determine server health without having to wait for a next out-of-band polling interval as with conventional methods. By determining server health directly resulting from TCP and HTTP client requests, multiple connection retries on an unavailable server are prevented. The method for providing server health checking of a server in a network includes activating an in-line server health checking mechanism by monitoring a data path of a server as to health status. Results from the health status analysis are ultimately reported to an authority on server health.

19 Claims, 5 Drawing Sheets

IN-LINE SERVER HEALTH CHECKING

FIELD OF THE INVENTION

The present invention relates to server health checking, and more particularly to an in-line system and method for checking the health status and availability of a server in a network.

BACKGROUND OF THE INVENTION

In distributed networks, it is often desirable to spread processing and communications activity evenly across all resources at the disposal of the network. The motivation for even distribution is to avoid overwhelming any one device within the network, thus slowing down operation of all processes and communications channeled through the device in the network. Load balancing is essentially the shifting of activity from one server or processor to another. When one device reaches a selected level of processing activity (i.e., begins to be overloaded), or a load balancing algorithm receives input as to a potential for an overloaded condition, or the health of a server affects its performance in a relevant amount, or for other load balancing considerations, load balancing techniques forward new or additional requests to another server with more capacity at that time. Thus, the practice of load balancing attempts to automatically distribute workloads among servers and processors within the network.

Part of load balancing requires the network being able to determine whether a particular server or processor has capacity, and also whether the server or processor is sufficiently healthy to take on additional requests. Accordingly, networks often make use of server health checking mechanisms to monitor the health of a server in a network. Generally speaking, in one form of health checking a server health check (SHC) mechanism polls each active server with a transmission control protocol (TCP) out-of-band query on a periodic basis. The query returns results indicating such things as whether the server is operating, whether aspects of the server are operational, and the like. Based on the results of the SHC query, the network can take different components, such as servers, in the network offline if they are malfunctioning, and put them back online if they regain health.

SUMMARY OF THE INVENTION

There is a need for a system and method for executing in-line server health checks. The present invention is directed toward further solutions to address this need.

In accordance with one embodiment of the present invention, an in-line server health check mechanism is provided, formed of an in-line health analysis mechanism for monitoring a data path of a server as to health status a reporting mechanism for conveying the health status of the server to a desired authority on server health, and a selection mechanism, for tracking the server health status.

In accordance with aspects of the present invention, the in-line server health check mechanism can have a communication link with an out-of-band server health check mechanism.

In accordance with aspects of the present invention, the in-line server health check mechanism can include a notification generator for generating notifications to an event system regarding the health status of the server.

Working in conjunction with the present invention, an out-of-band server health check mechanism is provided for generating polls of the server outside of the data path to confirm reports from the in-line server health check mechanism.

In accordance with further aspects of the present invention, return-to-health queries can be sent out polling a failed server at repeated intervals to determine if the server is available.

In accordance with one embodiment of the present invention, in a network, a method of checking a health status of a server includes activating an in-line server health checking mechanism by monitoring a data path of a server as to health status. The health status of the server is reported to an out-of-band server health check mechanism.

In accordance with aspects of the present invention, the method can further include activating a first timer for a selected duration upon initialization of the server to suppress polling by the out-of-band server health check mechanism while the first timer is operating. The first timer can be re-started for additional initializations of the server. A second timer can be activated for a selected duration upon expiration of the selected duration of the first timer. Polling by the out-of-band server health check mechanism can be initiated to determine the health status of the server.

In accordance with aspects of the present invention, reporting the health status of the server can include reporting that the server is down. A return-to-health query of the server that is down can be initiated. The return-to-health query can repeat a selected number of times at a selected interval. A health status from the out-of-band server health check mechanism can have priority over a health status from the in-line server health check mechanism according to predetermined parameters.

In accordance with further aspects of the present invention tracking includes maintaining a table of health status information. The method can further include communicating the server health status to an out-of-band server health check mechanism. The out-of-band server health mechanism can initiate polling to determine the health status of the server.

In accordance with further aspects of the present invention, a health status from the out-of-band server health check mechanism can have priority over a health status from the in-line server health check mechanism according to predetermined parameters. Reporting the health status of the server can include reporting that the server is one of up, downgraded, and down. A return-to-health query can be initiated if the server is down. The return-to-health query can repeat a selected number of times at a selected interval.

In accordance with one embodiment of the present invention, a medium for use in a network environment on an electronic device is provided. The medium holds instructions executable using the electronic device for performing a method of checking a health status of a server. The method includes activating an in-line server health checking mechanism by monitoring a data path of a server as to health status, analyzing a server response, reporting the health status of the server to an out-of-band server health check mechanism, and tracking the health status.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

An illustrative embodiment of the present invention relates to a system and method providing in-line server health checks to determine server health without having to wait for a next out-of-band polling interval as with conventional methods. The term "in-line" as utilized herein refers to in the same band as the data being transported between a client and a server in a network. Contrarily, the term "out-of-band" as utilized herein indicates a band other than that being utilized for data transfer. In an example implementation utilizing TCP or HTTP protocols, if a server is unresponsive due to a failed TCP connection or HTTP request, the server is removed from operation and thus removed from consideration for load balancing. By determining server health directly over TCP and HTTP client requests utilizing the in-line server health check, the generation of new requests to an unhealthy or an unavailable server are prevented. The down server can be deemed unavailable without waiting for a next out-of-band poll to determine a failed server.

FIGS. 1 through 5, wherein like parts are designated by like reference numerals throughout, illustrate an example embodiment of a system and method for server health checking between nodes in a network environment, according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, in a manner still in keeping with the spirit and scope of the present invention.

Figure 1:
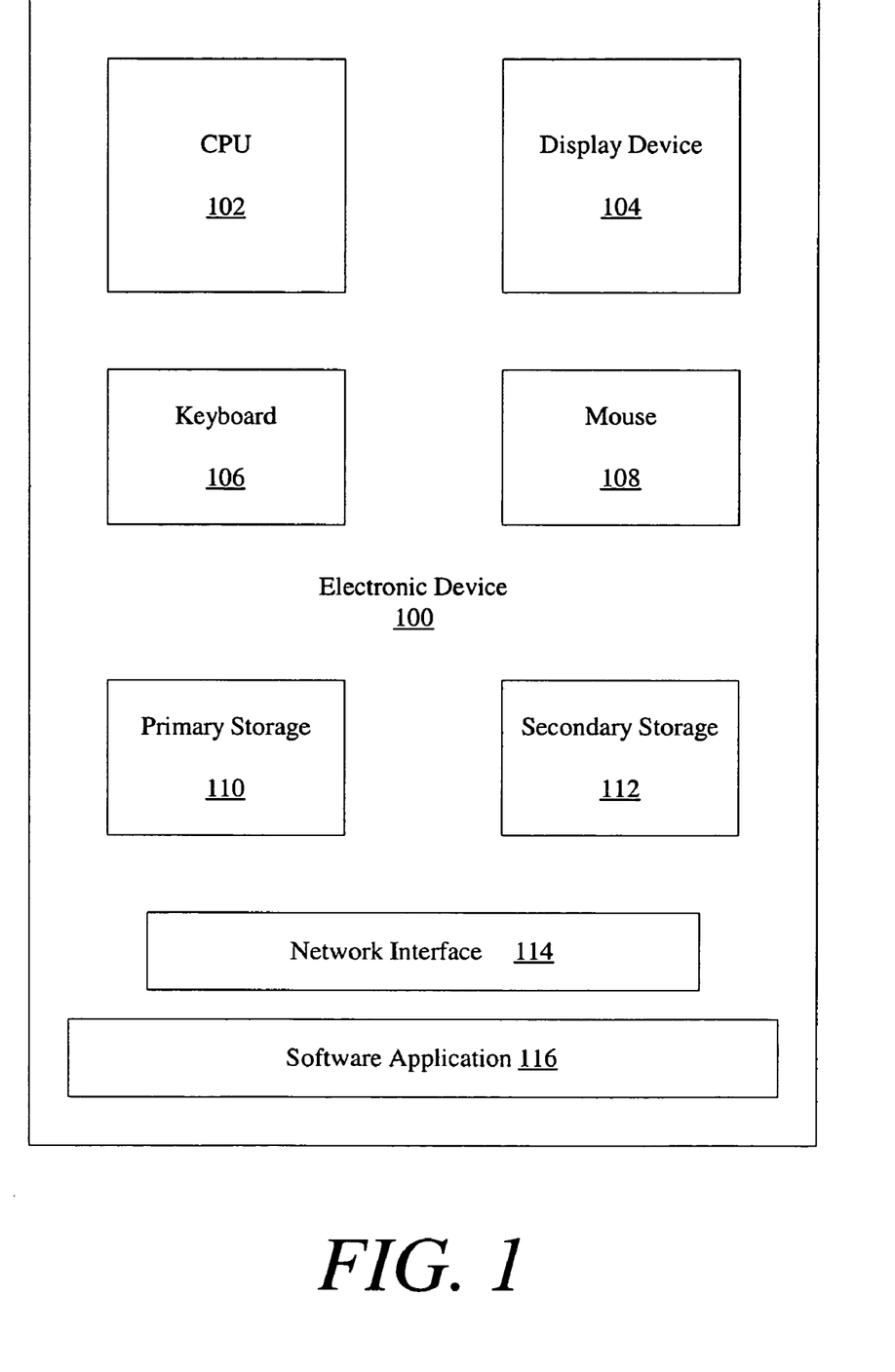
FIG. 1 is a diagrammatic illustration of an electronic device useful in executing the method of the present invention.

The present invention can be implemented on an electronic device, or in a network connecting multiple electronic devices. FIG. 1 illustrates one example embodiment of an electronic device 100 suitable for practicing the illustrative embodiments of the present invention. The electronic device 100 is representative of a number of different technologies, such as Internet appliances, routers, switches, personal computers (PCs), laptop computers, workstations, personal digital assistants (PDAs), cellular telephones, wireless devices, and the like. In the illustrated embodiment, the electronic device 100 includes a central processing unit (CPU) 102 and a display device 104. The display device 104 enables the electronic device 100 to communicate directly with a user through a visual display. The electronic device 100 further includes a keyboard 106 and a mouse 108. Other potential input devices not depicted include a stylus, trackball, joystick, touch pad, touch screen, and the like. The electronic device 100 includes primary storage device 110 and secondary storage device 112 for storing data and instructions.

The primary and secondary storage devices 110 and 112 can include, but are not limited to, such technologies as a floppy drive, hard drive, tape drive, optical drive, read only memory (ROM), random access memory (RAM), and the like. Applications such as browsers, JAVA virtual machines, C compilers, and other utilities and applications can be resident on one or both of the primary and secondary storage devices 110 and 112. The electronic device 100 can also include a network interface 114 for communicating with one or more electronic devices external to the electronic device 100 depicted. Modems and Ethernet cards, are examples of network interfaces 114 for establishing a connection with an external electronic device or network. The CPU 102 has either internally, or externally, attached thereto one or more of the aforementioned components. Interactive programming and/or development applications 116, and other applications can be installed and operated on the electronic device 100.

It should be noted that the electronic device 100 is merely representative of a structure for implementing portions of the present invention. However, one of ordinary skill in the art will appreciate that the present invention is not limited to implementation on only the described electronic device 100. Other implementations can be utilized, including an implementation based partially or entirely in embedded code, where no user inputs or display devices are necessary. In such an instance, a processor can communicate directly with another processor, or other device.

In networking, the Open System Interconnection (OSI) model defines a framework for implementing network protocols. The OSI model separates communications into seven layers. A brief description of each of the seven layers is provided. Layer 7 is the application layer, which supports application and end user processes. Layer 6 is the presentation layer, which provides translation services of data from application format to network format. Layer 5 is the session layer, which establishes, manages, and terminates connections between applications. Layer 4 is the transport layer, which provides transparent transfer of data between hosts, and deals with end-to-end error recovery. Layer 3 is the network layer, which provides switching and routing technologies. Layer 2 is the data link layer, which furnishes transmission protocol knowledge and management, and handles errors in the physical layer, flow control, and frame synchronization. Layer 1 is the physical layer, which conveys the bit stream through the network at the electrical or mechanical level.

More specific to the illustrative embodiment of the present invention, Layer 3, the network layer, creates logical paths. Data is transmitted over the paths in the form of packets, messages, or requests from node to node within the network. Routing and forwarding are functions of Layer 3, as well as addressing, internetworking, error handling, congestion control, and packet sequencing.

In networking, local area networks (LANs) are interconnected to each other creating wide area networks (WANs). WANs can also interconnect to create even larger WANs. There is often a mix of protocols from one network to another, especially between LANs and WANs. Example implementations of the present invention with regard to operation within a network rely on the network supporting TCP and HTTP protocols. However, one of ordinary skill in the art will appreciate that the named protocols are merely exemplary, and are provided to demonstrate enabling support for the claimed invention. The present invention, however, is not limited to use in networks supporting only those specific protocols utilized in the present description, including TCP and HTTP protocols. Instead, the present invention can be utilized in a network environment supporting one or more communication protocols that can make use of health status information of one or more components of that network.

Figure 2:
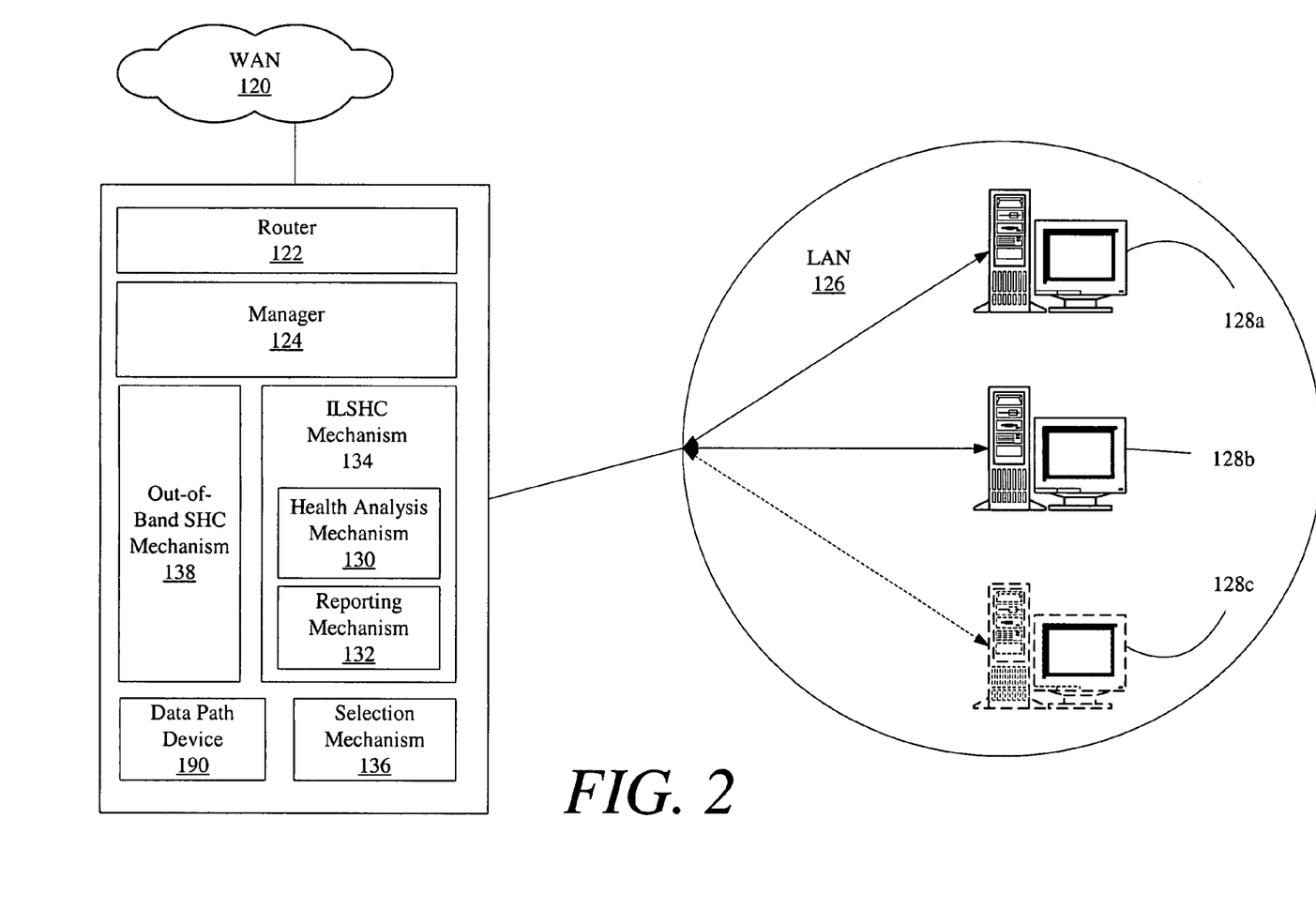
FIG. 2 is a schematic illustration of a network configuration, according to one aspect of the present invention.

FIG. 2 is an illustration of an example network configuration that relies on an embodiment of the present invention to handle data flow. The figure depicts one possible physical arrangement of network devices in accordance with one example embodiment of the present invention. In FIG. 2, a WAN network 120 connects with a LAN network 126 through a router 122. It should be noted that the LAN network 126 can be a LAN network, WAN network, or other network operating using standard network protocols and interconnected in some manner through the some form of the router 122. It should further be noted that there can be other network components, such as firewalls, and additional routers and switches that partake in the communication connection between the WAN 120 and the LAN 126, or other network couplings. In addition, it should be noted that the term "manager" as utilized herein relates to a network management and configuration functionality. The manager 124 is a support function in a networking device that enables the user configuration of the present invention, as well as a statistics and event reporting path.

The LAN 126 is shown to include at least one server 128 (shown as servers 128a, 128b, and 128c individually, and herein referred to as servers 128 collectively). The present invention is largely concerned with the health of individual components, such as the servers 128. The actual position of the servers 128 within a LAN verses a WAN or the Internet is not directly related to the novel aspects of the present invention. The present invention can be implemented in any number of different networks and network configurations having components whose health it would be beneficial to monitor.

In addition, one of ordinary skill in the art will appreciate that FIG. 2 merely illustrates one possible configuration of elements operating within the network. Each of these elements (e.g., the router 122, the manager 124, the out-of-band SHC mechanism 138, the ILSHC mechanism 134, and the like) can exist in different combinations. Accordingly, the present invention is not limited to the specific combination of these elements as shown in the figures. Rather, the figures illustrate one example embodiment of the present invention, and corresponding structural configurations for implementing the present invention.

The electronic device 100 can be useful in the implementation of health checking of components in the LAN 126 by supporting or, optionally, functioning (in different embodiments) as one or more of the mechanisms described below. An in-line server health check (ILSHC) mechanism 134 is provided, formed of a health analysis mechanism 130 and a reporting mechanism 132, the operation of which will be discussed in more detail later herein. In addition, a selection mechanism 136 is also in communication with the ILSHC mechanism 134.

Prior to discussing the details of the present invention, it should be noted that the present invention can be useful in the task of load balancing within a network, such as the LAN 126. The LAN network 126, as shown, includes the collection of servers 128. The servers support various applications and represent the destinations of the messages or data packets that attempt to gain entry to the LAN network 126.

Accordingly, as mentioned previously, the load balancing calculations performed within or by network systems can benefit from input as to the health of a particular server of the bay of servers 128 to proportionally distribute load based at least in part on capacity. Thus, a system and method are required to check on the health status of the servers 128.

Conventionally, health checking is performed using out-of-band polling or queries, as mentioned in the Background. In short, out-of-band polling involves probing servers 128 at regular intervals to determine, in part, if they are available for load balancing operations. If a server 128 is unresponsive, the health analysis mechanism 130 removes the server as a participating load balancer within the service group, leaving remaining servers 128 to handle the traffic load.

With out-of-band polling, and in accordance with example implementations that can make use of the present invention, there are three conventionally utilized probe types, namely, HTTP, TCP, and Internet Control Messaging Protocol (ICMP) that are sent out by an out-of-band SHC mechanism 138. The type of probe utilized is determined in part by the type of information required. Considerations for the type of information required include what applications are operating on the servers 128, memory and bandwidth resources available, and other service considerations. The polling probes or queries are sent out to the servers 128 on a predetermined interval or period. Thus, there are gaps in time where servers 128 may experience health problems but there will be a delay in a data path device 190 and selection mechanism 136 learning about the health problems because they occurred in between the polling intervals. Until the next polling interval sends out a query, the data path device 190 may still send traffic load to that failed server.

Another consideration relates to the number of servers requiring health checks. As the quantity of servers increases, the poll interval increases due to the existence of finite resources available to support the out of band functionality of the out-of-band SHC mechanism 138 further increasing the delay of detection of failures in any one server 128.

Figure 3:
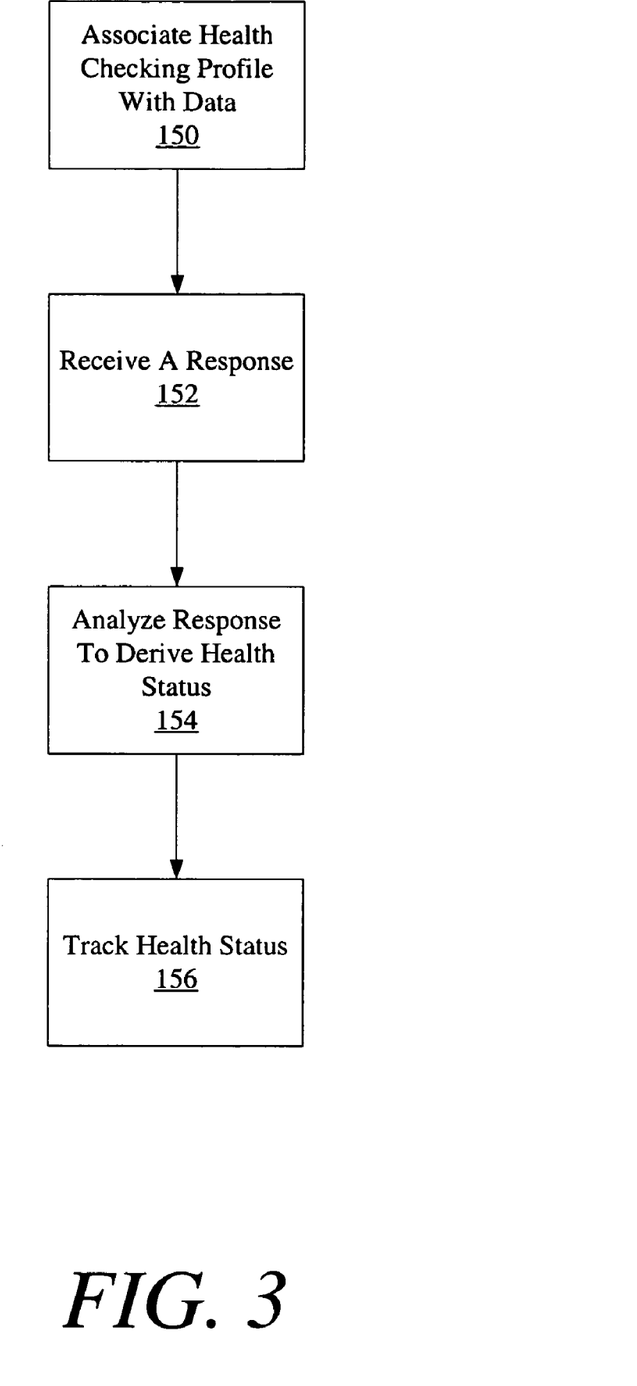
FIG. 3 is a flowchart illustrating one example health checking method executed in accordance with one aspect of the present invention.

The present invention provides in-line health checking of the servers 128, which is distinct from conventional out-of-band health checking. FIG. 3 is a flowchart illustrating one example implementation of the method of the present invention for in-line health checking. The ILSHC mechanism 134, or some equivalent application within the LAN 126 or in communication with the LAN 126 incorporating the destination servers 128, associates a health checking profile with data flowing to the servers 128 (step 150). The data can be in the form of, for example, packets, messages, and/or requests. The servers 128 receive the data and return a response (step 152). The ILSHC mechanism 134 receives the response and, based on user configurable predicates, the health analysis mechanism 130 portion of the ILSHC mechanism 134 analyzes various criteria to derive a health status of the server that sent the response (step 154). The ILSHC mechanism 134 takes the resulting analysis from the health analysis mechanism 130, and uses the reporting mechanism 132 to forward the information for consideration by the out-of-band SHC mechanism 138 in its duties as the authority on absolute and relative server health. The health status is tracked (step 156) such as through the construction of server weight tables sent to the selection mechanism 136. It should be noted that a database 184 (see FIG. 4) could be updated prior to receiving an authoritative update from the out-of-band SHC mechanism 138. The selection mechanism can perform the load-balancing selection function based on the information. If desired, return-to-health queries can be subsequently issued polling a failed server at repeated intervals to determine if the server is available. This can be done by the conventional out-of-band SHC mechanism 138.

The data path device 190 can perform one or more of redirecting service, closing service, and initiating new service based on the relative server health. The reporting mechanism 132 can also serve as a notification generator for generating notifications to an event system regarding the health status of the server.

Figure 4:
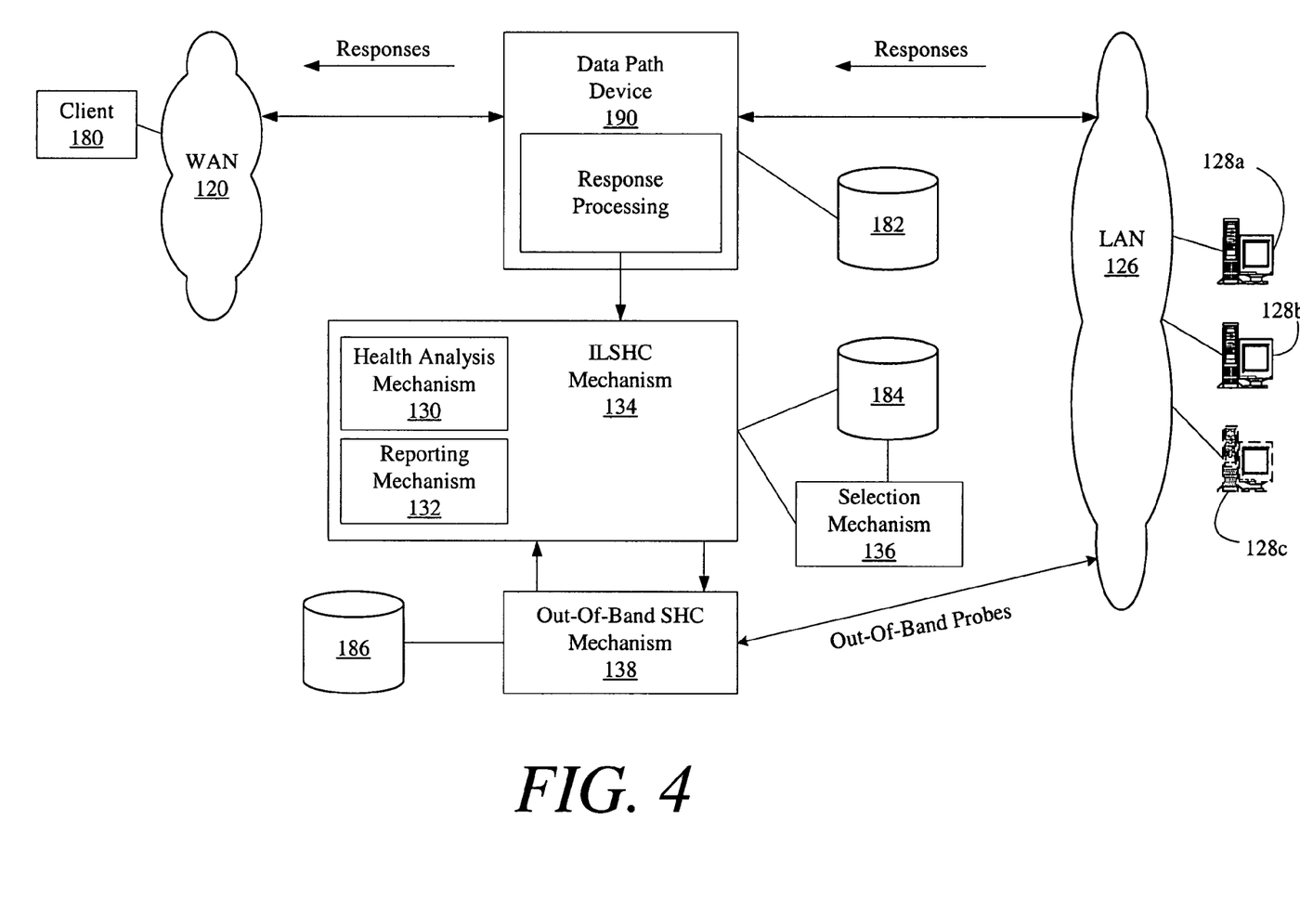
FIG. 4 is a diagrammatic illustration of a health checking system, in accordance with one aspect of the present invention.

FIG. 4 is a diagrammatic illustration of one embodiment of the configuration and interrelationship between several of the mechanisms described herein that execute the in-line server health check process of the present invention. The figure builds upon the basic network structure illustrated in FIG. 2, and thus utilizes like reference numbers for like components, where appropriate. Additional components shown in this figure include a client 180, which serves as the originator of the request. Various databases 182, 184, and 186 provide supporting information to each of the mechanisms to which they feed information. For example the database 182 can contain user configurable ILSHC rules, which indicate what types of responses, or other criteria related to the responses, should trigger different health status indications. The database 184, in communication with the ILSHC mechanism 134, can include server state and weight tables. The database 186, in communication with the out-of-band SHC mechanism 138 can also include server state and weight tables. The data flows through a data path device 190 to and from the destination servers 128.

In operation, the system illustrated in FIG. 4 performs as follows, in accordance with one example embodiment of the present invention. The client 180 sends a request through the WAN 120 to the intended destination of the servers 128. The servers 128 provide a response to the request. The response can be, for example, an acknowledgement, a request for additional information, data, and the like. A user provides a set of criteria or predicates, such as known error codes, timeliness for response, application content, response content, and the like, which support an analysis of the response to determine relative health of the server 128 sending the response. Thus, an application program resident within, for example, the health analysis mechanism 130, analyzes the response based on the user configurable predicates. A determination of health status is made based on the user configurable predicates and the analysis of the response. In addition, the out-of-band SHC mechanism 138 can forward the health status to server selection mechanism 136, which provides a load balanced server selection to the data path device 190.

In accordance with the present invention, because the data is more continuously flowing to the servers 128, there are more opportunities for the ILSHC mechanism 134, using the health analysis mechanism 130, to check on the health status of the servers 128, versus the relatively less frequent out-of-band probing procedure. More frequent reports can be made to the out-of-band SHC mechanism 138 in a more efficient manner than having to wait for the more sporadic interval results from the out-of-band SHC polling mechanism performed by the out-of-band SHC mechanism 138.

For example, in FIG. 2, servers 128*a* and 128*b* are shown in solid line, and server 128*c* is shown in dashed line. The solid line servers 128*a* and 128*b* are active and healthy servers. The dashed line server 128*c* is down and thus is not operational. Accordingly, using the method of the present invention and in accordance with one example implementation, an ILSHC health status analysis of the server 128*c*, for example an HTTP request and response, will return a message to the out-of-band SHC mechanism 138 using the reporting mechanism 132 that the server 128*c* is down. Upon receipt of the server down message, the out-of-band SHC mechanism 138 can re-balance server weights that will cause traffic to be distributed to the other two servers 128*a* and 128*b* until the problems with the down server 128*c* are rectified. The authority on server health (i.e., the out-of-band SHC mechanism 138) receives the notification more quickly from the reporting mechanism 132 of the ILSHC mechanism 134 than from the periodic polling operations of the out-of-band SHC mechanism 138 itself, because the instant that a response is returned having characteristics that indicate a health issue, the ILSHC mechanism 134 indicates that the server 128*c* is down. There is no waiting for an SHC probe at some pre-determined interval to be sent to the down server 128*c* to check the health status.

Figure 5:
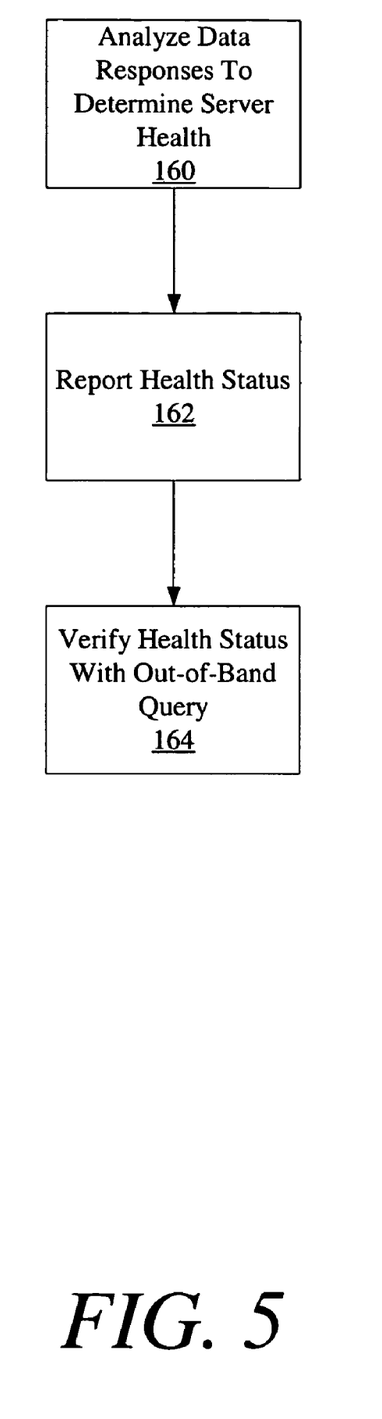
FIG. 5 is a flowchart illustration one example method for verification of health status in accordance with one aspect of the present invention.

There can further be a communication link between the ILSHC mechanism 134, or reports therefrom, and the conventional out-of-band SHC mechanism 138. As previously mentioned, it should be noted that the local selection state 184 can be updated independently before updating the out-of-band SHC mechanism 138 to further decrease the response time to server failure. FIG. 5 shows one example implementation of the present invention in conjunction with a conventional SHC mechanism 138 query. The ILSHC mechanism 134, using the health analysis mechanism 130, monitors the data flowing to the servers 128 and analyzes the responses (step 160). The ILSHC mechanism 134, using the reporting mechanism 132, returns a report of health issues with a server 128 to a location such as the out-of-band SHC mechanism 138 (step 162). The health issues can then prompt the use of the out-of-band SHC mechanism 138 to send an out-of-band SHC query to confirm the health status of the servers 128 (step 164). In other words, the ILSHC mechanism 134 report can prompt the sending of a series of out-of-band SHC queries, if desired, to determine a return to health transition.

The communication of health issues revealed by the ILSHC mechanism 134 can occur directly between the out-of-band SHC mechanism 138 and the ILSHC mechanism 134. In addition, the network can be configured to give different priority to return messages from ILSHC mechanisms versus the out-of-band SHC mechanism 138. Thus, if conflicting reports are received, the out-of-band SHC mechanism 138 is able to determine whether a traffic load should continue to be sent to the potentially down server in accordance with the pre-selected priorities.

Some potential health status indications are as follows. The timeliness of a response from the server 128 to the client 180 can be a source of health status analysis. A connection level health status can be determined. An application level status can also by determined. Actions based on the health status analysis can include, in TCP protocol, unexpected reset or close actions, in HTTP protocol, server error messages or other content indications can result. The ILSHC mechanism 134 can report that a server is down, which means that there was no response from the server. A server's relative health can also be downgraded based upon timeliness of responses. If the server is not down, or downgraded, the server is indicated as up, which means the server returned a response having the appropriate characteristics or properties.

The health status is used in the determination of proportional share of future server load. For example, a particular server 128 can have any of the above identified health status indications. Based on the health status of the server 128, the proportional share of future load carried by that server can be adjusted. For some applications and servers, there is a Boolean on/off adjustment to the proportional share. This means that either the server is available for handling future traffic, or not available. There can alternatively be a proportional designation, such as from zero percent to one hundred percent, with regard to the portion of future traffic able to be handled by the server 128. Thus, the health status generated by the ILSHC mechanism 134 is useful in the implementation of load balancing, and traffic allocation, to the servers 128.

It should be noted that the components utilized in carrying out the method of the present invention can be implemented both as physical, hardware-based, devices and as virtual, software-based, mechanisms. One of ordinary skill in the art will appreciate that such devices such as the manager, the ILSHC mechanism, the out-of-band SHC mechanism, reporting mechanisms, switches, routers, and corresponding functions implemented by these devices can be implemented in both hardware and software entities.

The present invention provides the in-line checking of health status of servers that support destinations of data in the form of packets, messages, and/or requests.

Additionally provided is the ability to receive the health status information and react appropriately, such as by performing load balancing operations to avoid sending traffic loads to a down server. The in-line server heath check mechanism returns a faster indication of health problems with a server because the health status of the server is assessed by monitoring the data path to and from the server, and selected properties or characteristics of the data, such as timeliness. There is no arbitrary period or interval at which health check probes are sent to check on the status of a server. In addition, the in-line health check information can be utilized in conjunction with out-of-band SHC mechanisms to provide a more robust server health status indication within a network. The in-line server health check process provides quick preliminary information as to server health, and the out-of-band server health check process can be prompted by, and confirm, initial indications from the in-line server health check mechanism.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the appended claims is reserved. It is intended that the present invention be limited only to the extent required by the appended claims and the applicable rules of law.

What is claimed is:

1. In an electronic device, a health check system, comprising:
    an in-line server health check mechanism, comprising:
        an in-line health analysis mechanism for monitoring a server in a data path of the server relative to selected criteria to determine health status; and
        a reporting mechanism for conveying the health status of the server;
    a selection mechanism, for tracking the server health status; and
    an out-of-band server health check mechanism for generating polls of the server outside of the data path, the out-of-band server health check mechanism further comprising a return-to-health mechanism for polling a failed server at repeated intervals to determine if the server is available.

2. The health check system of claim 1, wherein the health status is used in the determination of proportional share of future server load.

3. The health check system of claim 1, wherein the in-line server health check mechanism further comprises a communication link with an out-of-band server health check mechanism.

4. The method of claim 1 wherein the in-line server health check mechanism determines server health directly from the data path such that multiple connection retries on an unavailable server are avoided.

5. The method of claim 4 wherein the data path includes TCP and HTTP client requests.

6. In a network supporting a network protocol, a method of checking a health status of a server, comprising:
    activating an in-line server health checking mechanism by monitoring a data path of the server;
    analyzing a response from the server relative to selected criteria to determine health status;
    reporting the health status of the server; and
    tracking the server health status, tracking further comprising:
        initiating polling via an the out-of-band server to determine the health status of the server; and
        communicating the server health status to the out-of-band server health check mechanism, the a health status from the out-of-band server health check mechanism having priority over a health status from the in-line server health check mechanism according to predetermined parameters.

7. The method of claim 6, wherein tracking comprises maintaining a table of health status information.

8. The method of claim 6, wherein reporting the health status of the server comprises reporting that the server is one of up, downgraded, and down.

9. The method of claim 8, further comprising initiating a return-to-health query if the server is down.

10. The method of claim 9, wherein the return-to-health query repeats a selected number of times at a selected interval.

11. The method of claim 6 wherein the in-line server health check mechanism determines server health directly from the data path such that multiple connection retries on an unavailable server are avoided.

12. A medium for use in a network environment on an electronic device, the medium holding instructions executable using the electronic device for performing a method of checking a health status of a server, the method comprising:
    activating an in-line server health checking mechanism by monitoring a data path of the server;
    analyzing a response from the server relative to selected criteria to determine health status;
    reporting the health status of the server, reporting the health status of the server further comprising reporting that the server is one of up, downgraded, and down;
    initiating a return-to-health query if the server is down; and
    tracking the server health status.

13. The medium of claim 12, wherein tracking comprises maintaining a table of health status information.

14. The medium of claim 12, further comprising communicating the server health status of an out-of-band server health check mechanism.

15. The medium of claim 14, further comprising the out-of-band server health mechanism initiating polling to determine the health status of the server.

16. The medium of claim 15, wherein a health status from the out-of-band server health check mechanism has priority over a health status from the in-line server health check mechanism according to predetermined parameters.

17. The medium of claim 12, wherein the return-to-health query repeats a selected number of times at a selected interval.

18. The method of claim 12 wherein the in-line server health check mechanism determines server health directly from the data path such that multiple connection retries on an unavailable server are avoided.

19. The method of claim 18 wherein the data path includes TCP and HTTP client requests.

* * * * *